United States Patent [19]

Gerhardt

[11] 3,960,276
[45] June 1, 1976

[54] TRANSPORTER FOR FLAT WORKPIECES
[75] Inventor: Klaus Gerhardt, Rheurdt, Germany
[73] Assignee: G. Siempelkamp and Co., Krefeld, Germany
[22] Filed: Mar. 10, 1976
[21] Appl. No.: 556,966

[30] Foreign Application Priority Data
Mar. 9, 1974 Germany............................ 2411299

[52] U.S. Cl.............................. 214/1 BT; 214/8.5 D
[51] Int. Cl.[2]......................................... B65G 59/04
[58] Field of Search............. 214/8.5 D, 6 FS, 1 BT, 214/650 SG, 1 BB; 212/73

[56] References Cited
UNITED STATES PATENTS

| | | | |
|---|---|---|---|
| 1,524,067 | 1/1925 | Troutman et al............. | 214/1 BT X |
| 2,701,065 | 2/1955 | Bertel.......................... | 214/6 BA X |
| 3,161,309 | 12/1964 | Baudhvin et al................ | 212/73 X |
| 3,179,262 | 4/1965 | Carlson, Sr. et al.......... | 214/1 BT X |

Primary Examiner—Frank E. Werner
Attorney, Agent, or Firm—Karl F. Ross; Herbert Dubno

[57] ABSTRACT

In order to carry boards or plates between two locations, a rack spanning these locations supports a pair of independently elevatable track structures each comprising a group of parallel rails interleaved with those of the other track structure. The rails of each group are engaged by respective carriages together forming a transport unit, each carriage being provided with several depending suction cups for picking up a workpiece. A transport unit carrying a workpiece moves on a lower level in one direction whereas an idle transport unit returns in the opposite direction on a higher level, thereby avoiding interference of the returning unit with the working unit and its load.

10 Claims, 5 Drawing Figures

TRANSPORTER FOR FLAT WORKPIECES

FIELD OF THE INVENTION

My present invention relates to a machine for carrying flat workpieces, such as sheet-metal plates or pressed boards, between two locations referred to hereinafter as a loading station and an unloading station.

BACKGROUND OF THE INVENTION

It is frequently necessary to carry a large number of such workpieces in quick succession over a predetermined path, e.g. from a stack of such workpieces to a conveyor serving to separate them from one another. For a rapid transfer from a loading station to an unloading station, two transport units may be used, one of which picks up a workpiece at the loading station and carries it to the unloading station while the other, having released a previously engaged workpiece at that unloading station, returns empty to the loading station for another pickup. If it is desired to let the transport units travel back and forth along the shortest path, the problem arises of avoiding collisions therebetween and providing enough clearance so that the returning idle transport unit will not interfere with the oncoming working unit and its load.

OBJECT OF THE INVENTION

The object of my present invention, therefore, is to provide a highly compact machine of the aforedescribed character, with two transport units traveling simultaneously in opposite directions, in which the problem of collision avoidance is neatly solved.

SUMMARY OF THE INVENTION

I realize this object, in accordance with my present invention, by the provision of a first and a second track structure which are independently vertically displaceable on a rack extending from the loading station to the unloading station, each track structure including a plurality of substantially horizontal rails interleaved with those of the other track structure. A plurality of parallel carriages, movable along respective rails of each track structure, constitute a pair of transport units provided with workpiece-engaging means such as suction cups, the two track structures and their transport units being diplaceable by respective lifting means between a lower working level and an upper return level. The lifting means are correlated with respective drive means for moving either of the transport units on the working level from the loading station to the unloading station while the other transport unit is moved on the return level from the unloading station to the loading station.

According to a more particular feature of my invention, each track structure comprises a pair of transverse beams which interconnect the rails thereof at their ends to form a generally rectangular frame. In order to provide the necessary clearance in both relative positions of the track structures, i.e. with either of them at a higher level than the other, it is necessary to mount either the two beams of one track structure or at least one beam of each track structure above the associated rails with a difference in height at least equal to the spacing between the two aforementioned levels. In an advantageous embodiment, the frames of the track structures are relatively staggered so that the rails of each track structure are overlain by one beam of the other track structure; while this requires the elevation of only one beam of each frame, I prefer to make each frame substantially symmetrical by positioning its two end beams on the same level.

In order to maintain the necessary alignment between the several carriages of a transport unit, in the absence of a direct connection therebetween, I provide that unit with a plurality of synchronized transmissions on its frame, one for each carriage. Such transmissions are advantageously designed as endless chains extending along the rails of the frame. As lifting means I may employ respective hoisting devices for the two frames on the rack.

BRIEF DESCRIPTION OF THE DRAWING

These and other features of my invention will now be described in detail with reference to the accompanying drawing in which.

SPECIFIC DESCRIPTION

Figure 1:
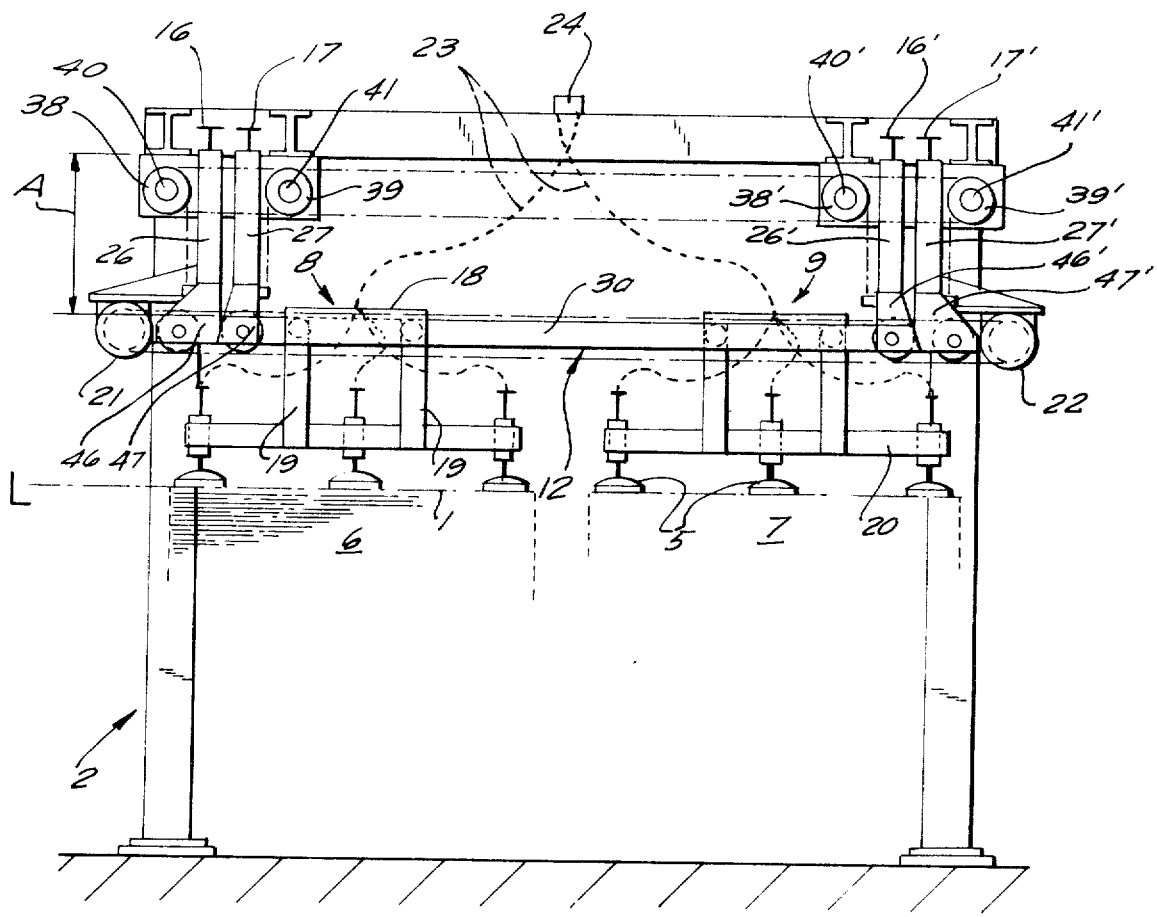
FIG. 1 is a somewhat diagrammatic side-elevational view of a two-unit transporter embodying my invention, the machine being shown in a transitory position in which its two transport units are disposed on the same level.
Figure 2:
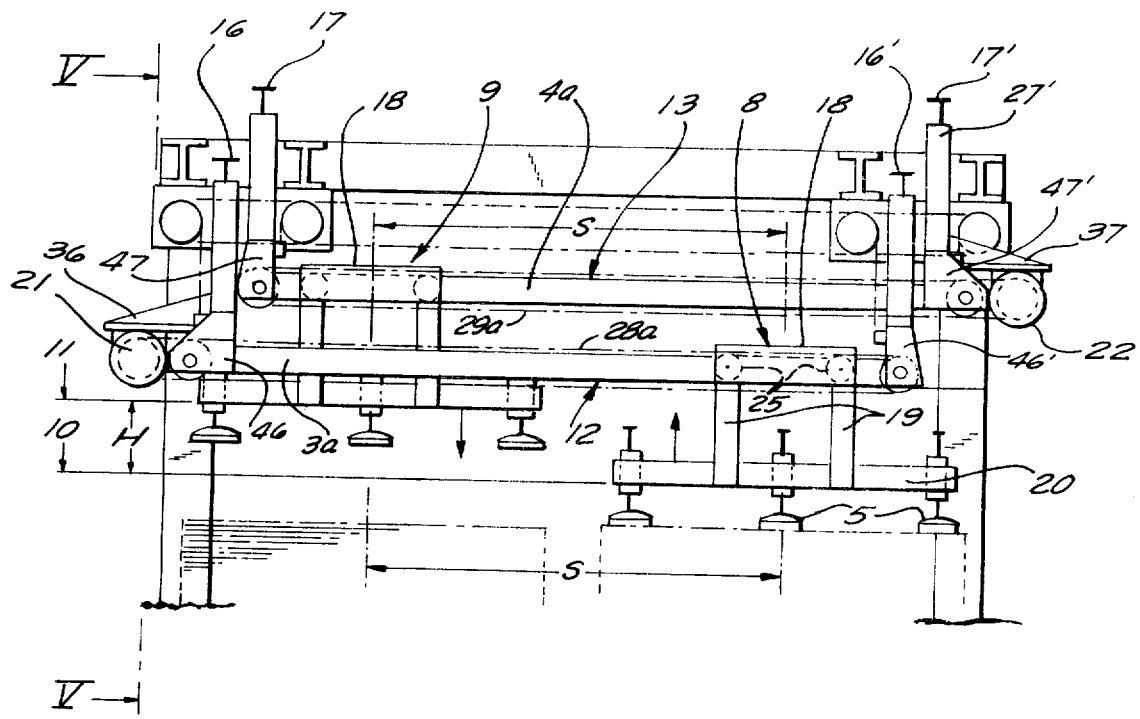
FIGS. 2 and 3 are views similar to FIG. 1, showing the two units alternately disposed on a working level and a return level.

The machine shown in the drawing serves for the transportation of flat workpieces 1 from a loading station 6 to an unloading station 7. Station 6 may comprise, for example, an elevatable platform on which fiberboard plates, laminated or not, are deposited after removal from a platen press, the platform rising intermittently to keep the uppermost workpiece 1 always on the same level L. Station 7 may comprise a conveyor, just below level L, carrying off these plates as fast as they are deposited thereon.

A rack 2, in the shape of a portal frame, straddles the two stations 6, 7 and supports a pair of independently elevatable track structures 12 and 13. Track structure 12 comprises four transversely spaced parallel rails 3a, 3b, 3c, 3d, designed for example as I-beams, whose ends are connected through vertical bars 26, 26' with a pair of cross-beams 16, 16' that are vertically spaced therefrom by a distance A. Similarly, track structure 13 comprises three parallel rails 4a, 4b, 4c which are interleaved with rails 3a – 3d and whose ends are connected through vertical struts 27, 27' with a pair of cross-beams 17, 17' that are vertically spaced therefrom by the same distance A. The rails and beams of each track structure thus define a rectangular frame whose length exceeds the spacing S of the midplanes of stations 6 and 7. The two frames are relatively staggered in the longitudinal direction, with beams 16, 16' lying to the left of beams 17, 17', respectively, as viewed in FIGS. 1 – 5.

The track structures 12, 13 support respective transport units 8, 9 respectively consisting of four carriages 8a, 8b, 8c, 8d hugging the rails 3a – 3d and three carriages 9a, 9b, 9c engaging the rails 4a – 4c. The carriages of each unit are parallel to one another and are synchronized by being anchored to respective endless chains 28a, 28b, 28c, 28d, extending alongside rails 3a – 3d, and 29a, 29b, 29c, extending alongside rails 4a –

4c. Chains 28a – 28d are led around sprockets 33a, 33b, 33c, 33d on a driven shaft 31 (FIG. 5), and around similar sprockets (not shown) on a nondriven shaft at the opposite end of rack 2. Analogously, chains 29a – 29c are led around sprockets 34a, 34b, 34c on a nondriven shaft 32 (FIG. 5) and around similar sprockets on a driven shaft at the opposite end. Shaft 31 is driven by a motor 21, mounted on a bracket 36 rigid with one of the struts 26, via a belt and a pulley 30; an analogous drive, including a motor 22 on a bracket 37 rigid with one of the struts 27', is provided for the chains of transport unit 9.

Each carriage comprises a yoke 19, provided with rollers 25 engaging the associated guide rails, having depending arms whose lower ends are secured to a horizontal bar 20 carrying three longitudinally spaced suction cups 5. Flexible conduits 23 extend from these suction cups to a source of vacuum 24 provided with nonillustrated control valves for alternately making the cups of units 8 and 9 effective to grip a workpiece 1. The twelve suction cups of transport unit 8 and the nine suction cups of transport unit 9 are disposed in two rectangular arrays generally conforming to the outlines of the workpieces.

The two track structures 12 and 13, with their transport units 8 and 9, can be bodily raised and lowered by a height H, less than the distance A, with the aid of respective hoist motors 14, 15 driving pairs of capstans 38, 38' on two shafts 40, 40' in the case of structure 12 and pairs of capstans 39, 39' on two shafts 41, 41' in the case of structure 13. In their lowered position, the rails of each structure support the bars 20 of their carriages at a level 10 which allows their suctions cups to contact the uppermost plate 1 of the stack at station 6. When raised, the bars of either unit lie at a level 11 at which their suction cups can pass between the carriages of the other unit without interfering with the transport of a workpiece by the latter. Shaft 40', directly connected with motor 14, and shaft 41, directly connected with motor 15, are linked with their counterparts 40, 41' through endless-chain transmissions including sprockets 42, 43. Cables wound around the capstans 38, 38' and 39, 39' are anchored to respective brackets 46, 46' and 47, 47'.

Figure 3:
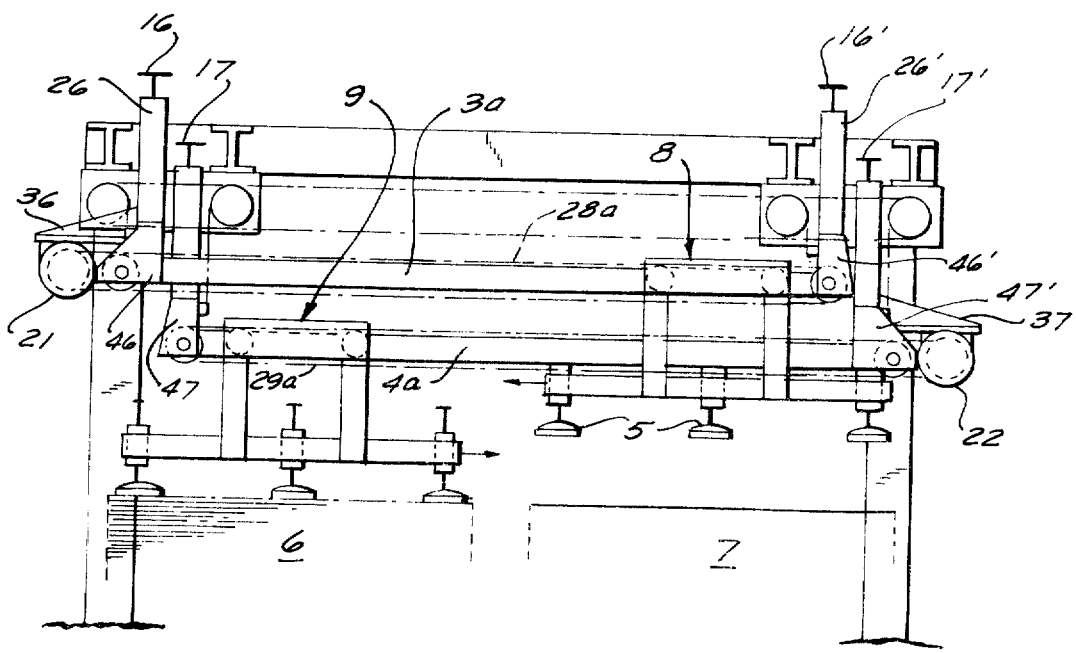
Figure 4:
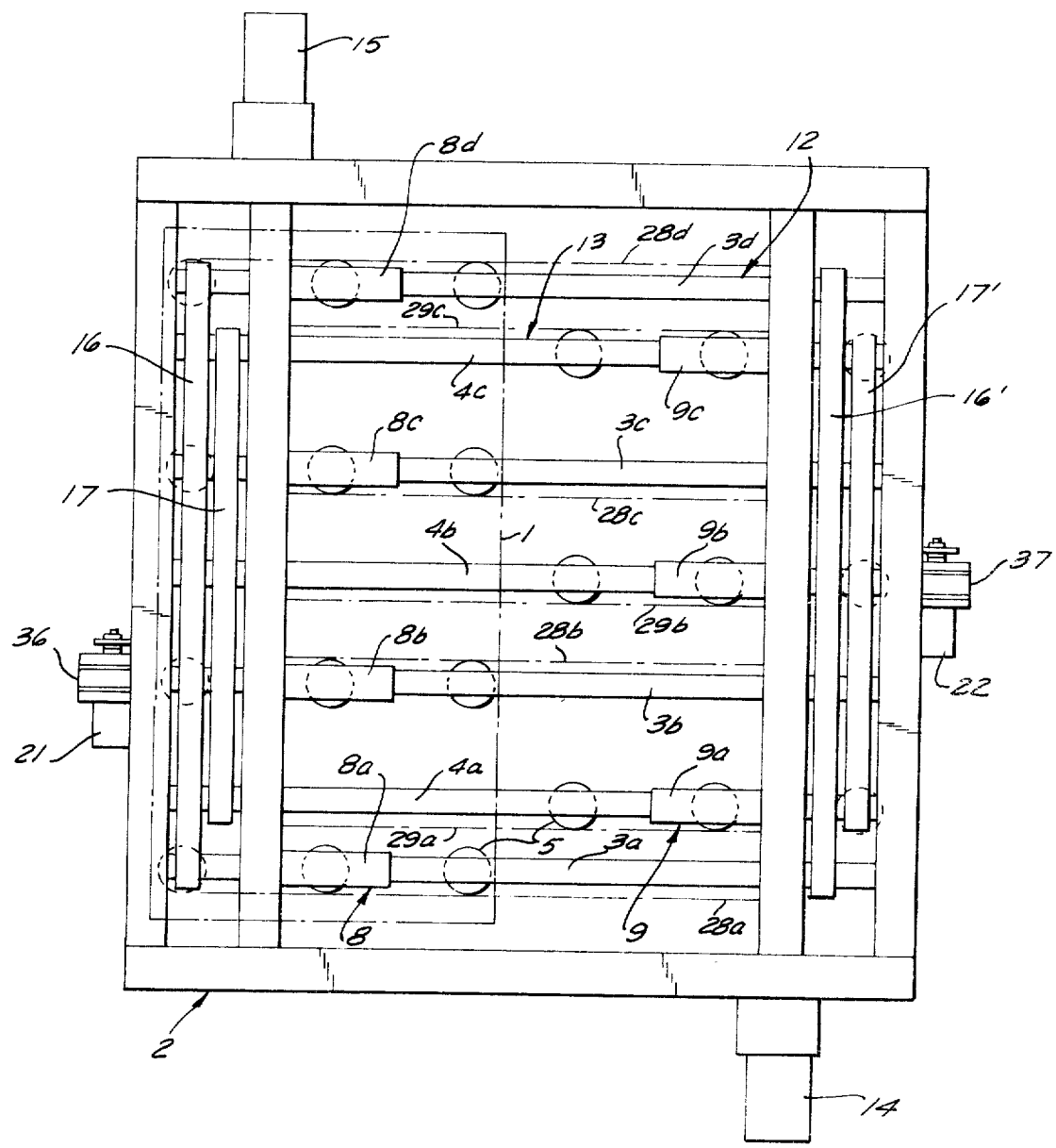
FIG. 4 is a somewhat diagrammatic top view of the machine shown in FIGS. 1 and 3.
Figure 5:
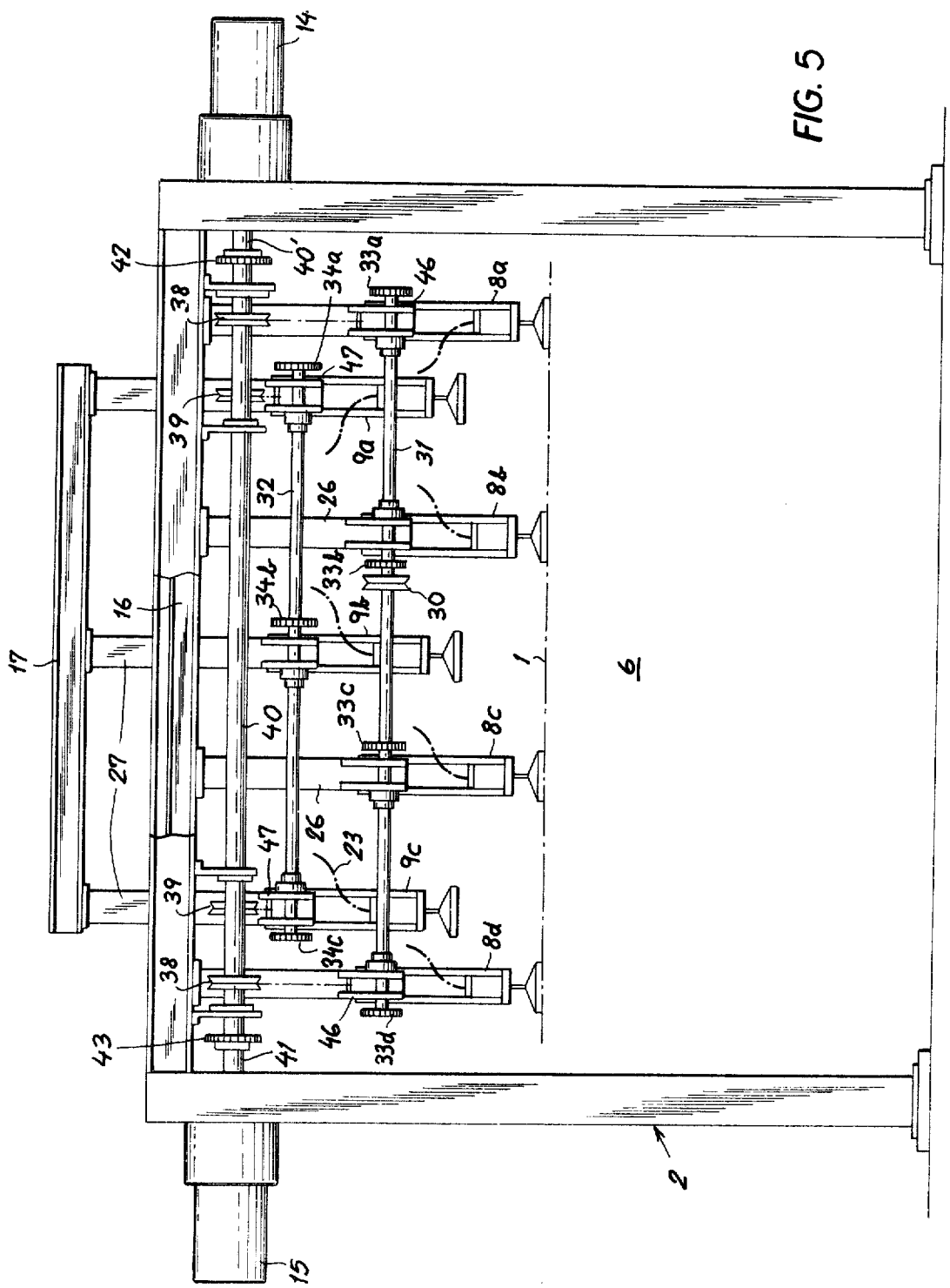
FIG. 5 is an end end view taken on the line V — V of FIG. 2.

Manually, or through a nonillustrated programmer, the operations of the hoist motors 14, 15, the drive motors 21, 22 and the control valves of vacuum source 24 are so correlated that one of the transport units, specifically unit 8 in FIG. 1, picks up a plate 1 at loading station 6 even as the other unit (9) deposits a previously transported plate at unloading station 7. Next, unit 9 rises to the higher level in order to return empty to the loading station while unit 8 travels with its load at the lower level to station 7, their positions at the end of their horizontal displacement being shown in FIG. 2. Thereafter, unit 9 is lowered onto the stack at station 6 whereupon unit 8 is lifted at station 7, as shown in FIG. 3, preparatorily to the commencement of another transport cycle with the roles of the two units interchanged.

The capstans 38, 38', driven by hoist motor 14, and 39, 39', driven by hoist motor 15, could be replaced by other lifting devices such as hydraulic or pneumatic jacks. These and other modifications, readily apparent to persons skilled in the art, are intended to be embraced within the scope of my invention except as otherwise limited by the appended claims.

I claim:
1. A machine for carrying flat workpieces along a predetermined path, comprising:
   a rack extending from a loading station to an unloading station;
   a first and a second track structure mounted on said rack for independent vertical displacement, each of said track structures including a plurality of substantially horizontal rails interleaved with those of the other track structure;
   a first transport unit including a plurality of parallel carriages movable along respective rails of said first track structure;
   a second transport unit including a plurality of parallel carriages movable along respective rails of said second track structure;
   workpiece-engaging means on each of said transport units;
   first and second lifting means for respectively displacing said first and second track structures together with their transport units between a lower working level and an upper return level; and
   drive means correlated with said first and second lifting means for moving either of said transport units on said working level from said loading station to said unloading station while moving the other transport unit on said return level from said unloading station to said loading station.

2. A machine as defined in claim 1 wherein each of said track structures comprises a pair of transverse beams interconnecting the rails thereof at their ends, thereby forming a generally rectangular frame.

3. A machine as defined in claim 2 wherein said frames are relatively staggered with one beam of each frame overlying the rails of the other frame, the overlying beam being elevated above the associated rails by a distance at least equal to the spacing between said levels.

4. A machine as defined in claim 3 wherein both beams of each frame are elevated above the associated frames by said distance.

5. A machine as defined in claim 2 wherein said drive means comprises a plurality of synchronized transmission elements, one for each carriage of a transport unit, on each of said frames.

6. A machine as defined in claim 5 wherein said transmission elements are endless chains extending along the rails of each frame, said drive means further comprising a transverse shaft at an end of each frame provided with a plurality of sprockets respectively engaged by said chains.

7. A machine as defined in claim 1 wherein said first and second lifting means include respective hoisting devices on said rack.

8. A machine as defined in claim 1 wherein each of said carriages comprises a yoke with two guide rollers engaging the respective rails and with depending arms supporting said workpiece-engaging means.

9. A machine as defined in claim 8 wherein said workpiece-engaging means comprises a horizontal bar secured to the lower ends of said arms and a plurality of suction cups spaced along said bar.

10. A machine as defined in claim 9 wherein the suction cups of the carriages of each transport unit form a rectangular array.

* * * * *